United States Patent
Moroda

(10) Patent No.: US 12,106,096 B2
(45) Date of Patent: Oct. 1, 2024

(54) MONITORING DEVICE THAT RECEIVES NOTIFICATION COMMANDS FROM AN EXTERNAL DEVICE FOR DETECTING INFORMATION AND DETERMINES WHETHER INFORMATION HAS ALREADY BEEN DETECTED, MONITORING METHOD, AND STORAGE MEDIUM

(71) Applicant: CANON KABUSHIKI KAISHA, Tokyo (JP)

(72) Inventor: Hajime Moroda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/192,807

(22) Filed: Mar. 30, 2023

(65) Prior Publication Data

US 2023/0342146 A1     Oct. 26, 2023

(30) Foreign Application Priority Data

Apr. 21, 2022  (JP) ................. 2022-069967

(51) Int. Cl.
  *G06F 9/06*      (2006.01)
  *G06F 11/30*     (2006.01)
(52) U.S. Cl.
  CPC ............. *G06F 9/06* (2013.01); *G06F 11/30* (2013.01)
(58) Field of Classification Search
  None
  See application file for complete search history.

(56) References Cited

U.S. PATENT DOCUMENTS

| 10,666,450 | B2  | 5/2020  | Miki et al. |
| 2013/0215266 | A1 | 8/2013 | Trundle et al. |
| 2017/0315967 | A1* | 11/2017 | Boucher ............... G06F 40/205 |
| 2019/0036723 | A1* | 1/2019 | Miki ...................... G06F 13/00 |

FOREIGN PATENT DOCUMENTS

| JP | 2005-065148 A | 3/2005 |
| JP | 2017-102644 A | 6/2017 |
| JP | 2020-072456 A | 5/2020 |

OTHER PUBLICATIONS

European Search Report issued on Sep. 7, 2023, which is enclosed, that issued in the corresponding European Patent Application No. 23163695.2.

* cited by examiner

*Primary Examiner* — Andrew H Lam
(74) *Attorney, Agent, or Firm* — Cowan, Liebowitz & Latman, P.C.

(57) ABSTRACT

In order to provide a monitoring device in which a pre-determined action is stably executed in response to detected pre-determined information, a monitoring device has a rule control unit configured to execute a pre-determined action according to a detection of pre-determined information; a determination unit configured to determine whether or not the detection of the pre-determined information has already occurred; and a notification control unit configured to, when rules in the rule control means are set or changed, in the case in which it has been determined that the pre-determined information has already been detected by the determining unit, transmit information to a display control device so as to display a message to the effect that the detection has already occurred.

11 Claims, 10 Drawing Sheets

FIG. 3

| Event example | Corresponding notification command | Field showing the notification contents |
|---|---|---|
| Illegal operation (movement) | Notification Report | Home Security – Tampering, product moved |
| Moving body detected | Notification Report | Home Security – Motion detection |
| Moving body not detected | Notification Report | Home Security – State idle – Motion detection |

FIG. 8

| Event example | Stateful Event | Paired event |
|---|---|---|
| Illegal operation (movement) | NO | N/A |
| Moving body detected | YES | Moving body not detected |
| Door opening | YES | Door closing |

MONITORING DEVICE THAT RECEIVES NOTIFICATION COMMANDS FROM AN EXTERNAL DEVICE FOR DETECTING INFORMATION AND DETERMINES WHETHER INFORMATION HAS ALREADY BEEN DETECTED, MONITORING METHOD, AND STORAGE MEDIUM

BACKGROUND OF THE INVENTION

Field of the Invention

The present invention relates to a monitoring device, a monitoring method, and a storage medium.

Description of Related Art

Conventionally, a monitoring device is known that is able to acquire monitoring for video images, and audio by performing control using remote operations via a network or the like. This monitoring device can be used together with an external device that sends notification commands by detecting specific information. Specifically, it is possible to use reception events for notification commands from an external device as triggers and to perform rule setting so that that actions such as starting image recording or the like are performed.

Japanese Unexamined Patent Application, First Publication No. 2020-72456 discloses a control method that changes controls such as starting/stopping image recording, masking, or the like according to notifications from an external device such as a sensor or the like, or human detection results from video image analysis. Japanese Unexamined Patent Application, First Publication No. 2017-102644 discloses a control server that detects the occurrence of events based on information received from an information providing service within a pre-determined time period, and in the case in which the occurrence of a plurality of events is detected within the pre-determined time period, causes an operational execution service to execute an action.

However, in the case in which rules that execute pre-determined actions with reception events for notification commands corresponding to pre-determined information detected by an external device serving as triggers are set or changed, there are cases in which these detections have already occurred prior to this. In such cases, notifications are not made for these detections, and there is a possibility that an error will occur in which, as long as a new notification command is not sent from the external device, the set action not being executed will not be realized by the user.

The present invention takes the problematic point that has been described above into consideration, and one of its aims is the provision of a monitoring device in which pre-determined actions are reliably executed in response to pre-determined information having been detected.

SUMMARY OF THE INVENTION

The monitoring device according to one aspect of the present invention comprises at least one processor or circuit configured to function as:
a rule control unit configured to execute a pre-determined action according to a detection of pre-determined information;
a determination unit configured to determine whether or not the detection of the pre-determined information has already occurred; and
a notification control unit configured to, when rules in the rule control unit are set or changed, in the case in which it has been determined by the determining unit that the pre-determined information has already been detected, transmit information to a display control device so as to display a message to the effect that the detection has already occurred.

Further features of the present invention will become apparent from the following description of embodiments with reference to the attached drawings.

BRIEF DESCRIPTION OF THE DRAWINGS

FIG. 3 is a diagram showing an example of an event according to the first embodiment and one example of a configuration thereof as a table.

FIG. 8 is a diagram showing an example of a table for a stateful event according to the first embodiment.

DETAILED DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
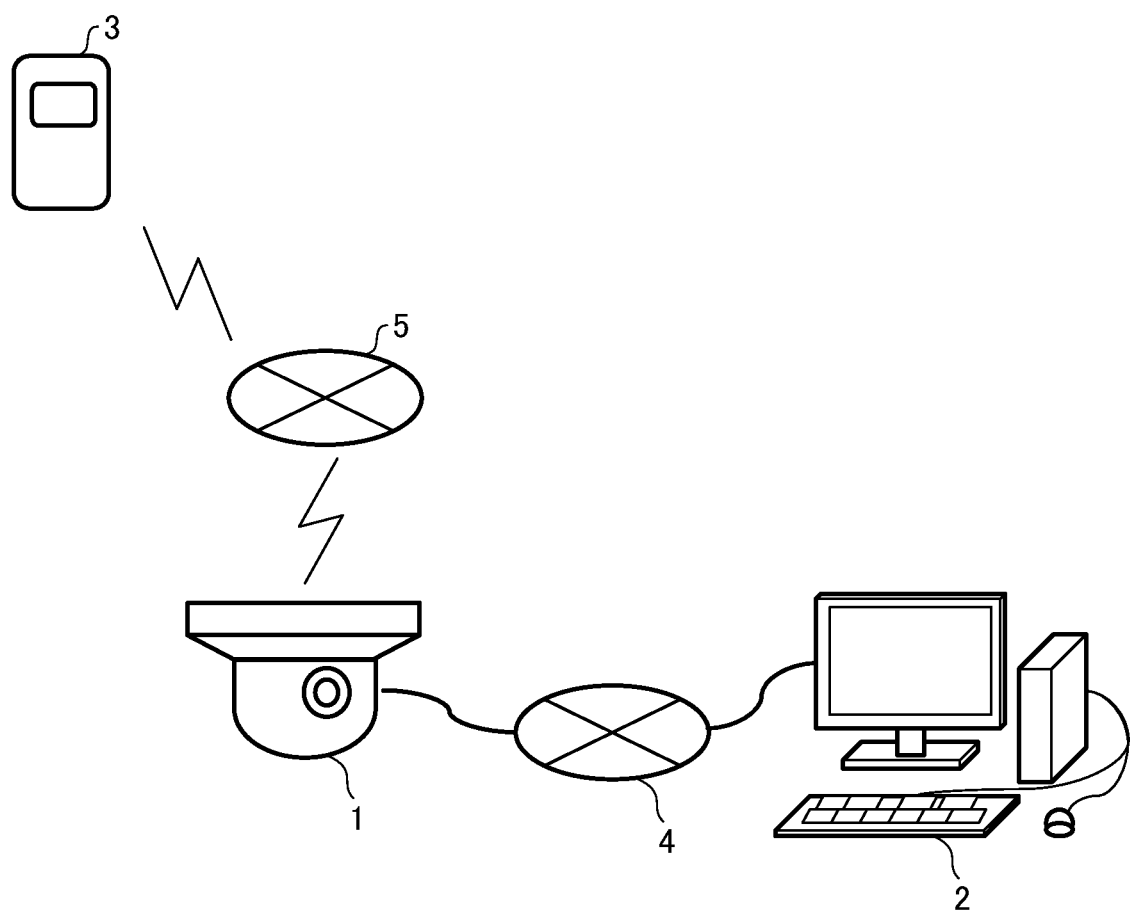
FIG. 1 is a diagram showing one example of a configuration of a monitoring system according to a first embodiment of the present invention.

FIG. 1 is a diagram showing one example of a configuration of a monitoring system according to a first embodiment. The monitoring system of the present embodiment comprises a monitoring device 1, a client device 2, detection device 3, a network 4, and a network 5. The detection device 31 one example of an external device.

The monitoring device 1 is a device having a function of monitoring a state of a detection device 3. For example, a network camera can be used in the monitoring device 1. The monitoring device 1 performs communications with a client device 2 and the detection device 3.

The client device 2 controls a function of the monitoring device 1. For example, an information processing apparatus such as a PC (personal computer) or the like can be used in the client device 2. Note that the client device 2 has a display unit, and functions as a display control device configured to control a display unit.

The detection device 3 includes, for example, a detection device that performs state detections such as a PIR (passive infrared ray detection) sensor or a door sensor. In the case in which the detection device 3 is a PIR sensor, if, for example, a moving body is detected, a notification command related to a moving body detection is transmitted to the monitoring device 1. In this context, the detection device 3 functions as an external device configured to detect pre-determined information. Note that the pre-determined information includes information that shows the state of the external device itself.

In addition, in the case which other circumstances occur, such as the detection device 3 being moved by an illegal operation, or the detection direction being changed, it is also possible to send notification commands that notify the monitoring device 1 about the detection of these circumstances. The detection device 3 may also hold a plurality of arbitrary commands in addition to these.

Note that the commands are configured by, for example, the command class, command name, and the field, which are data included in the command, or the like, and are transmission data that are used for transmitting commands and notifications between devices.

In addition, the detection unit 3 is, for example, battery driven, and there is a need to limit its electricity consumption, and therefore, is in a sleep state other than when the connection is established, directly after this, or the like, and it is assumed that even if the monitoring device 1 sends a query as to the present detection state to the detection device 3, it will not immediately return a response. However, even if the detection device 3 is in sleep mode, as long as it has not been set so as to not immediately respond, the notification commands are configured so as to be transmitted from the detection device 3 to the monitoring device 1.

The monitoring device 1 and the client device 2 are connected in a state in which they can communicate with each other via a network 4. The network 4 is configured of, for example, a plurality of routers, switches, cables, and the like that fulfill a communication standard such as Ethernet (registered trademark) or the like. However, as long as communicate between the monitoring device 1 and the client device 2 is possible, any kind of communication standard, scope, or configuration may be used.

The client device 2 transmits each type of control information to the monitoring device 1. The control information includes, for example, the information for setting (and changing) rules related to rules for trigger events and the corresponding actions, controlling the monitoring device 1, or the like.

Note that the monitoring device 1 transmits responses to the received control information to the client apparatus 2. In addition, the monitoring device 1 transmits information including the contents that should be displayed on the display unit of the client apparatus 2 to the client apparatus 2.

The monitoring device 1 and the detection device 3 are connected in state in which they are able to communicate with each other via, for example, a wired network 5. Z-Wave, Zigbee (registered trademark), Bluetooth (registered trademark), WiFi (registered trademark), or another wireless PAN (Personal Area Network) can be used as the network 5.

In addition, networks according to each type of communication standard such as a wireless LAN (Local Area Network) or the like may also be used, and as long as communication is possible between the monitoring device 1 and the detection device 3, any kind of communication standard, scope, or configuration may be used.

The monitoring device 1 first assigns node numbers to external devices as management numbers, and the monitoring and control of each device begins after its registration as a device on the network 5. In addition, the monitoring device 2 and the detection device 3 perform the transmission and reception of control commands for establishing, maintaining, and ending communications between the monitoring device 1 and the detection device 3 according to necessity.

In addition, a plurality of detection devices may each exist on the network 5. Next, the explanation will continue assuming that the monitoring device 1 and the detection device 3 are connected by Z-Wave.

The monitoring device 1 receives a control signal related to rule setting from the client apparatus 2 after being connected in a state in which mutual communications are possible with the detection device 3, and sets rules that are configured by events and pre-determined actions associated with the notification commands received from the notification device 3.

In addition, the monitoring device 1 and the detection device 3 have product identification numbers. Product identification numbers are unique identification numbers that have been determined for each product, and devices that are the same product will have the same identification number. Note that the product identification number may also be defined as a combination of a plurality of identification numbers such as a manufacturer identification number, a product type identification number that has been determined by a manufacturer, a product identification number that has been determined by a manufacturer, or the like.

Figure 2:
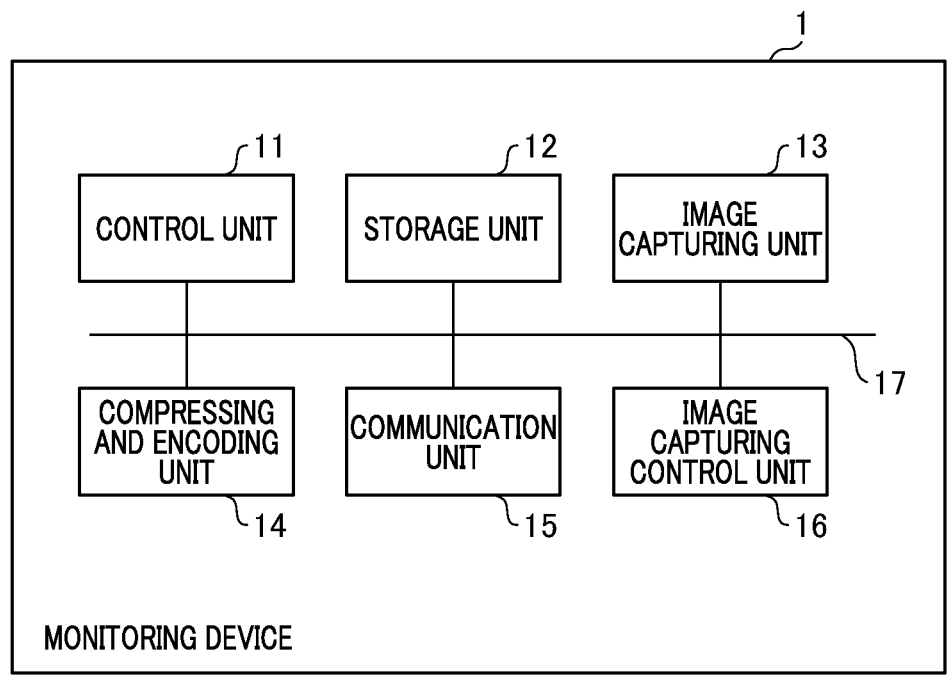
FIG. 2 is a functional block diagram of a monitoring device 1 according to the first embodiment.

Next, the configuration of the monitoring device 1 will be explained, FIG. 2 is a functional block diagram for a monitoring device 1 according to a First Embodiment.

Note that a portion of the functional blocks that are shown in FIG. 2 are realized by a computer, which is not illustrated, that is included in the monitoring device 1 executing a computer program that has been stored on a memory serving as a storage medium. However, a portion or the entirety thereof may also be realized by hardware. An application specific integrated circuit (ASIC), a processor (a reconfigurable processor, or a DSP), or the like can be used as the hardware.

In addition, each of the functional blocks that are shown in FIG. 2 do not need to be encased in the same body, and may also be configured by separate devices that have been connected to each other via a signal path.

The monitoring device 1 is provided with functional blocks such as a control unit 11, a storage unit 12, an image capturing unit 13, a compressing and encoding unit 14, a communication unit 15, an image capturing control unit 16, and the like. Each functional block of the monitor device 1 is connected by a bus 17.

The control unit 11 has, for example, a CPU (Central Processing Unit) that serves as a computer, and has functions that control the entirety of the monitoring device 1.

The storage unit 12 includes a memory that stores each type of data. The storage unit 12 functions as a storage medium for storing various data such as, primarily, a storage area for a computer program executed by the control unit 11, a work region during the computer program execution, and a storage region for image data that is generated by the image capturing unit 13, and the like.

In addition, the rule settings generated by the control unit 11 are stored in the storage unit 12 to serve as settings files, and the control unit 11 references and updates the settings and the like via the settings file as necessary.

The image capturing unit 13 includes, for example, a CMOS image sensor and the like for capturing images of a subject that has been imaged by an image capturing optical system of the monitoring device 1, and converts an analogue signal obtained by image capturing to digital image data. In addition, the image capturing unit 13 performs necessary image processing on the digital images, subsequently stores these in the storage unit 12 as captured images, and receives image acquisition events. The control unit 11 receives image acquisition events from the image capturing unit 13 in the case in which the captured image has been stored in the storage unit 12.

The compressing and encoding unit 14 generates image data by performing compression encoding processing based on a format such as JPEG (Joint Photographic Experts Group) or H. 264, and the like, on the captured images that have been stored by the image capturing unit 13, and stores these in the storage unit 12.

The communication unit 15 receives commands from the external device and transmits responses and the like to the commands that have been generated by the control unit 11 to the external device. The communication unit 15 receives and transmits pre-determined commands to and from the external device that detects the pre-determined information. In addition, when communication is established with the external device, notification information as to whether or not the external device has already detected the pre-determined information is acquired and stored in the storage unit 12.

The control unit 11 acquires command contents in the case in which the communication unit 15 has received commands from an external device. In addition, the communication unit 15 transmits control commands that have been generated by the control unit 11 to the external device. Furthermore, the communication unit 15 reads out the image data that has been compressed and encoded by the compressing and encoding unit 14 in order from the storage unit, and transits this to the client device 2 as a video image stream.

The image capturing control unit 16 changes the angle of view and the like of the image capturing unit 13 by pan driving, tilt driving, zoom driving, rotation driving, or focus driving the drive unit based on pan, tilt, rotation, zoom, or focus values that have been indicated by the control unit 11. Note that the monitoring device 1 may also be a configuration that does not include a drive unit.

Note that in the case in which the actions in the rule settings are actions such as email notifications or the like that do not require image capturing, the monitoring device 1 may also be a configuration that does not include an image capturing unit 13, a compressing and encoding unit 14, and an image capturing control unit 16.

Next, an example of an event that is used in the rule settings in the monitoring device 1, and the configuration thereof will be explained using FIG. 3.

FIG. 3 is a diagram showing an example of an event according to the first embodiment, and shows one example of a configuration thereof as a table. The first item in FIG. 3 shows an example of each type of event that is used in the rule settings. The second item shows a notification command corresponding to an event in the first item, and the third item shows a field showing the notification contents included in the communication command.

As is shown in the table in FIG. 3, each event is defined by a field that shows a notification command corresponding to that event, and the notification contents that are included in the notification command. In addition, there may also be additional conditions for event generation that have been set during the rule setting.

In FIG. 3, with respect to, for example, an illegal operation (movement) event that shows a state in which the detection device 3 has been illegally moved or had its orientation changed, the notification command from the detection device 3 is a notification report command.

In addition, the field that shows the notification contents is Notification Type: Home Security, Notification Event/State: tampering, product moved.

In addition, in FIG. 3, with respect to the moving body detection event that shows that a moving body has been detected in the vicinity of the detection device 3, the notification command from the detection device is a Notification Report command. In addition, the field that shows the notification contents is Notification Type: Home Security, Notification Event/State: Motion detected.

In addition, in FIG. 3, with respect to a moving body not detected event, which shows that the detection device 3 has not detected a moving body, the Notification Type is Home Security. In addition, the field that shows the notification contents is Notification Event/State: Idle, and Event/State Parameter: Motion Detection.

The control unit 11 receives notification commands from the detection device 3 via the communication unit 15, and generates events corresponding to the received notification commands. In addition, in the case in which there is an action linked to this event that serves as a rule setting, the control unit 11 executes this action, or commands an execution unit to execute the action.

Note that when communication is established with the detection unit 3, the control unit 11 acquires information relating to notification commands held by the detection device 3 and to the notification contents corresponding to these by an acquisition command, and stores these on the storage unit 12. Events that are usable as rule settings are determined by referencing a table such as that in FIG. 3 based on information relating to the notification commands of this detection device 3.

In addition, it is assumed that a table such as that in FIG. 3 is stored in the storage unit 12 in advance. Note that FIG. 3 is one example of the fields showing events, notification commands, and notification contents, and the responses to the fields showing the events, notification commands, and notification contents are not limited thereto.

Next, an example of the rule settings in the monitoring device 1, and the timings at which notification commands are transmitted by notifications corresponding to events being generated in the detection unit 3 will be explained using FIG. 4.

Figure 4A:
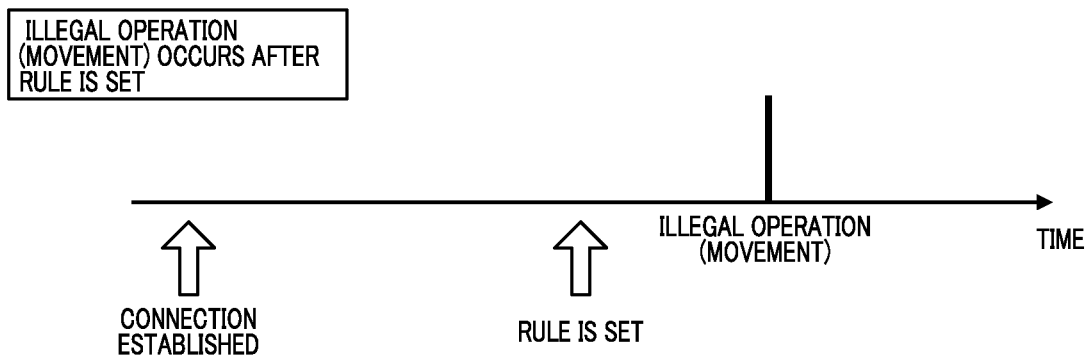
FIGS. 4A, and 4B are diagrams showing examples of timings for the occurrence of detections relating to single-occurrence events, and rule setting according to the first embodiment.
Figure 4B:
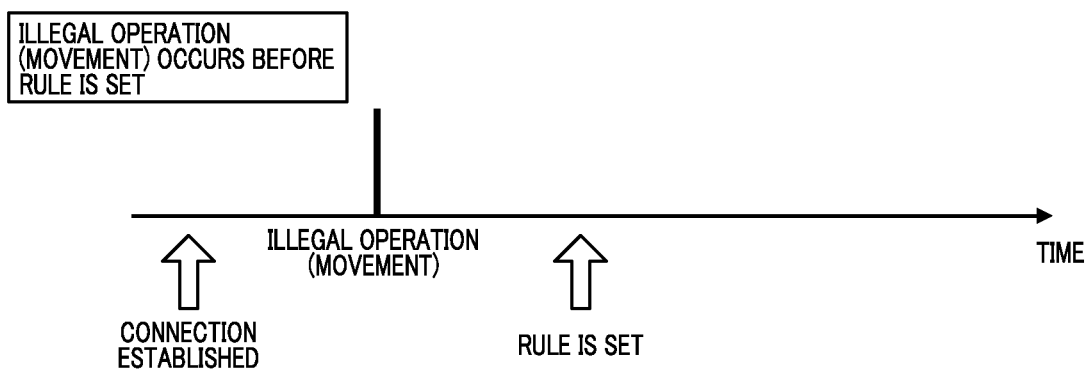

FIGS. 4A, and 4B are diagrams showing examples of timings for the generation of detections corresponding to single occurrence events and rule settings according to the first embodiment. Note that in the rule settings in FIGS. 4A, and 4B, singe occurrence events are set. Note that single occurrence events are events corresponding to notifications for which a plurality of states are not made.

In FIGS. 4A, and 4B, after a connection has been established such that the monitoring device 1 and the detection device 3 are able to communicate with each other, the monitoring device 1 receives a control command relating to rule settings from the client device 1. In addition, a rule that is configured by an event that is related to a notification command received from the detection unit 3, and a predetermined action are set. Note that in FIGS. 4A, and 4B, as an example, an illegal operation (movement) event is being set to serve as the event for the rule settings.

In the example in FIG. 4A, an illegal operation (movement) has not occurred before the rule is set, and after the rule is set, a notification command for an illegal operation (movement) is received by an illegal operation (movement) occurring. That is, after the rule is set, the notification command for the illegal operation (movement) is sent to the monitoring device 1 from the detection device 3 at the timing during which an illegal operation (movement) has occurred, and the action that has been set in the rule is executed.

In contrast, in the example in FIG. 4B, an illegal operation (movement) occurs before the rule is set, and an illegal operation (movement) does not occur after the rule has been set. Therefore, after the rule has been set, a notification command for the illegal operation (movement) is not transmitted, and the action that has been set in the rule is not performed. That is, even if there is a state in which an illegal operation (movement) is already occurring, the action will not be executed after the rule has been set until the illegal action (movement) occurs again.

Figure 5:
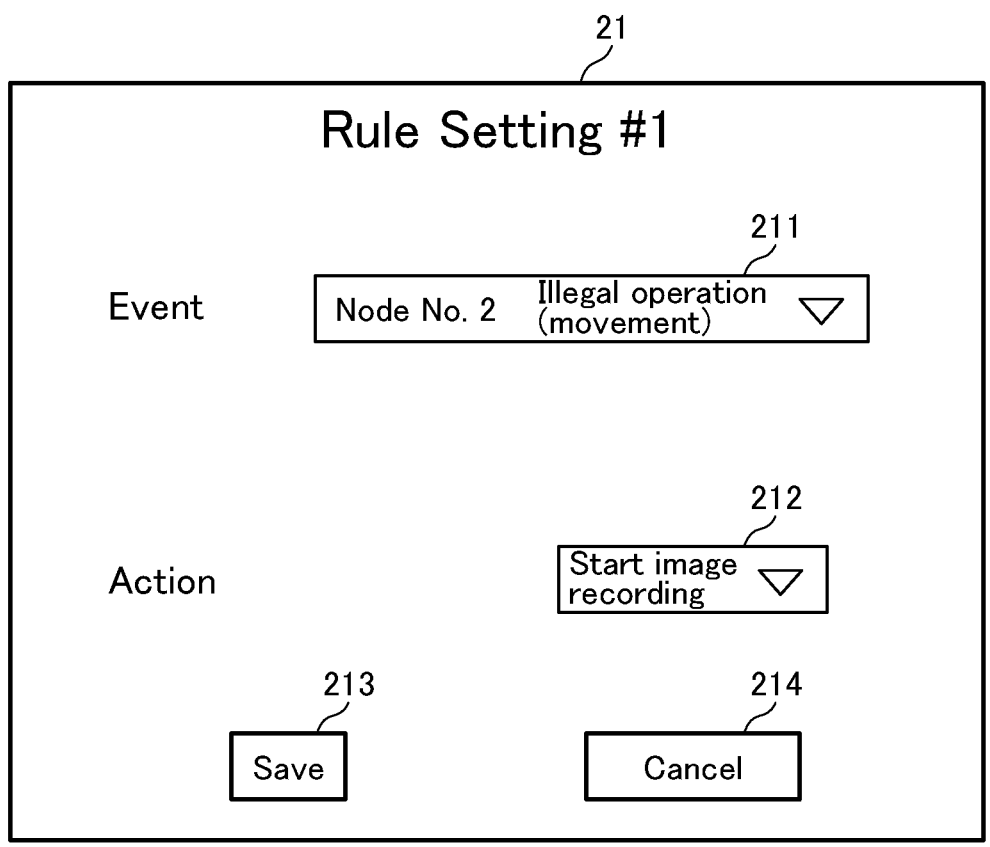
FIG. 5 is a diagram showing a display screen for use in setting rules that is displayed on a client device 2 according to the first embodiment.

Next, a display screen for setting rules that is displayed on the client device 2 will be explained. FIG. 5 is a diagram showing a display screen for use in setting a rule, which is displayed on the client device 2, according to the first embodiment. That is, it shows one example of a display screen 21 of a client device 2 for setting a rule that regulates an event and an action in accordance with this event in the monitoring device 1 from among the settings in the monitoring device 1.

The display screen 21 is displayed by the control unit, which includes the computer that is not shown, inside of the client device 2 executing a computer program that is stored on the storage unit of the client device 2 based on an event by a user and a command for setting an action.

The display screen 21 displays a selection list 211 for setting an event, and a selection list 212 for setting an action to be performed in the case that the event occurs. Note that the event generation conditions, the action execution conditions, the schedule or the like may also be displayed according to necessity. In addition, in the case in which an event is a stateful event, a selection list for indicating an action or the like for when the even finishes may also be displayed.

The display screen 21 displays a save button 213 for saving the settings, a cancel button 214 for cancelling the settings, and the like. In addition, in the case in which a plurality of rules can be set, the number and name for identifying the rule being set are indicated. For example, in FIG. 6, the rule identification number #1 is displayed.

The user operates the client device 2 while viewing a display screen such as that in FIG. 5, and performs rule setting (or changes) to the monitoring device 1. The events that become the triggers for when an action that has been indicated in the selection list 212 is executed are set in the selection list 211. For example, in FIG. 5, setting is performed such that the reception of an illegal operation (movement) notification command from a device with a node number 2 on the network 5 is made the trigger.

In this context, it is assumed that the detection device 3 is registered in advance as a device with a node number 2 on the network 5. Note that, the control unit 11 acquires the information for the notification commands held by the detection device 3 and the fields therefor using the storage unit 12, and transmits these to the client device 2 via the communication unit 15 to serve as the options in the selection list 211.

The actions that are executed when an event occurs are set in the selection list 212. In the example in FIG. 5, start image recording is set as the action, and the image captured by the image capturing unit 13 and compressed by the compressing and encoding unit 14 is stored in the storage unit 12, an external storage unit that is not shown, or the like.

Note that the type of action is not important as long as it is an action that can be set in the monitoring device 1. For example, the action may also be an image masking control, an angle of view control, a transmission control for a video image, an illumination control, which is not illustrated, a control for a preset position for image capturing, a control for display information superimposed on the image, or the like.

In addition, this may also be an action that does not use a captured image, for example, it may also be an action such as a control for command transmission to an external device, a control for message transmission via the network 4, a contact output control, which is not shown, an audio output control, which is not shown, or the like. Note that the options for the selection list 212 are transmitted to the client device 2 by the control unit 11 via the communication unit 15 along with information for the actions that are usable in the monitoring device 1.

The control unit of the client device 2 stores the information for the rule that has been set in the storage unit by the user pressing the save button 213. Note that, in the case in which the cancel button 214 has been pressed, the settings are not saved and performed. The control unit of the client device 2 transmits the information for the rule setting that has been input by the user to the monitoring device 1. The communication unit 15 of the monitoring device 1 receives information for the rule settings, the control unit 11 stores the information for the rule settings in the storage unit 12 as, for example, a settings file.

Next, a display screen that is displayed on the client device 2 and that prompts the notification of the detection completed state, and the execution of the action will be explained using FIG. 6.

Figure 6:
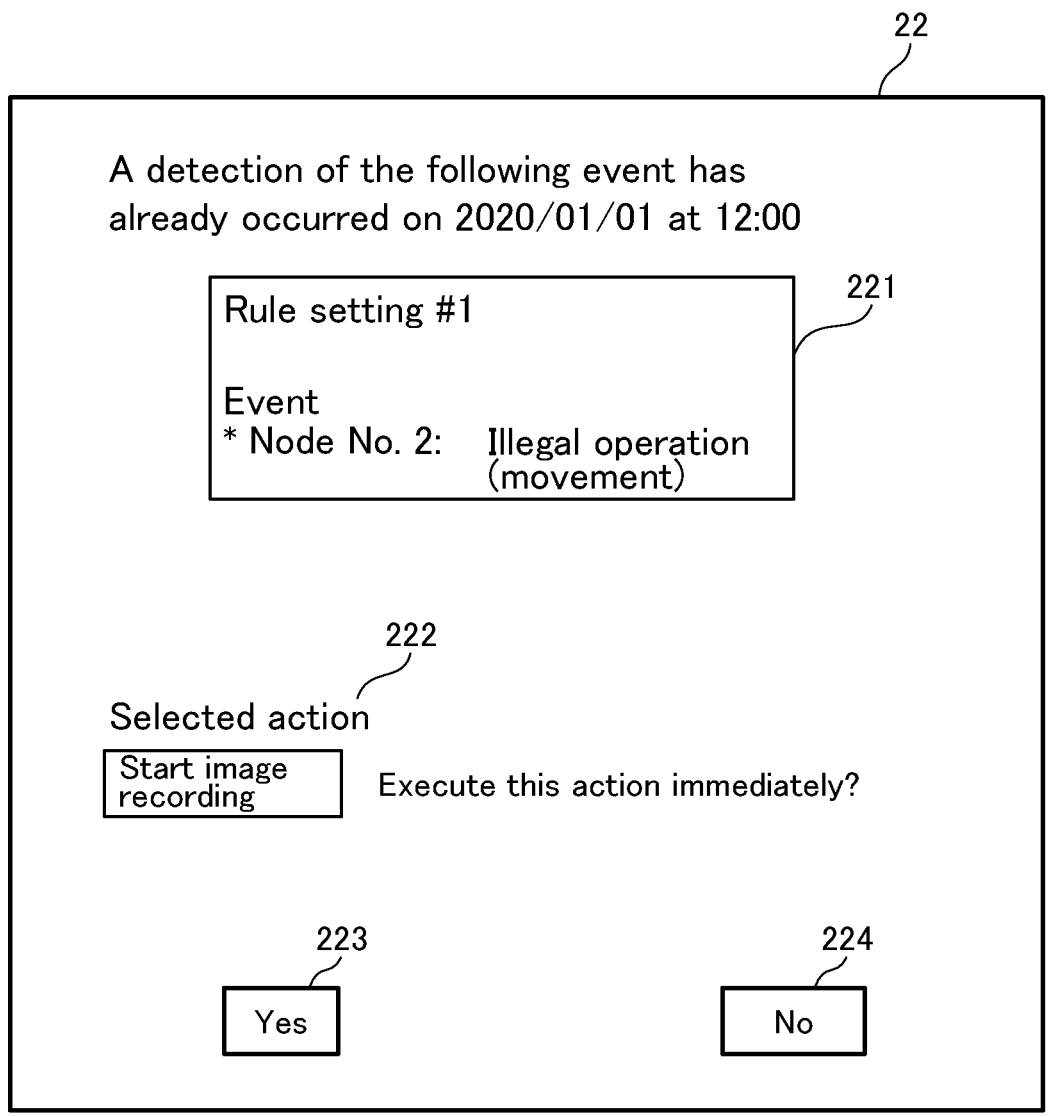
FIG. 6 is a diagram showing a display screen that prompts a notification of the state that detection is complete, and the execution of an action, which is displayed on a client device 2 according to the first embodiment.

FIG. 6 is a diagram showing a display screen that is displayed on the client device 2 and that prompts the notification of the detection completed state, and the execution of the action according to the first embodiment. In FIG. 6, after a rule is set or changed on the display screen 21 in FIG. 5, in the case in which the control unit 11 determines that a notification corresponding to the event that was set (or changed) in the rule, has already occurred after the rule has been set or changed, a display such as the display screen 22 is performed.

The display screen 22 is displayed by commands from the control unit 11 of the monitoring device 1 being transmitted to the client device 2 via the communication unit 15, and the program that is stored on the storage unit of the client device 2 being executed.

The display screen 22 has a display region 221 that shows that a notification corresponding to the event that was set in the rule has already occurred, as well as the detection time (or the reception time for the notification command). That is, information is transmitted to the display control device such that the notification occurrence time that is included in the notification command or the reception time for the notification command are displayed.

In addition, the display screen 22 also has a display region 222 for querying if the actions that have been set in the rules should be executed immediately. In addition, the display screen 22 displays a button 223 for determining to execute the action, and a button 224 for determining to not execute the action.

The user operates the client device 2 and determines whether or not to execute the action. Specifically, the user confirms the contents of the display region 221 and the display region 222, and in the case in which they will execute the action that has been set in the rule settings as #1, they press the button 223. In addition, the control unit of the client device 2 transmits an execution command for executing the action to the monitoring device 1 via the network 4.

In addition, the communication unit 15 of the monitoring device 1 receives the above-described execution command, and the control unit 11 controls the execution of the action. Note that by pressing the button 224, a cancel command that shows not to execute the action is transmitted. Alternatively, no commands are sent.

In the example of the display screen 22, the display region 221 displays that the illegal operation (movement), which is the event for the rule setting #1, was already detected before the rule was set or changed. In addition, it also displays that this detection occurred on 2020/01/01 at 12:00. In the case in which multiple detections have occurred, the newest detection time or the oldest detection times are alright, nd in the case in which multiple detections have been made, the time for each detection may also be displayed in a list.

That is, the processing may also be made such that information is transmitted to the display control device so as to display a plurality of detection occurrence times that have occurred in the past or the reception times for notification commands.

In addition, in the case in which the event has occurred before the connection was established, and the time is unclear, a message to this effect may also be disclosed. In addition, executing the action for starting to record images is displayed as an option on the display region 222.

Figure 7:
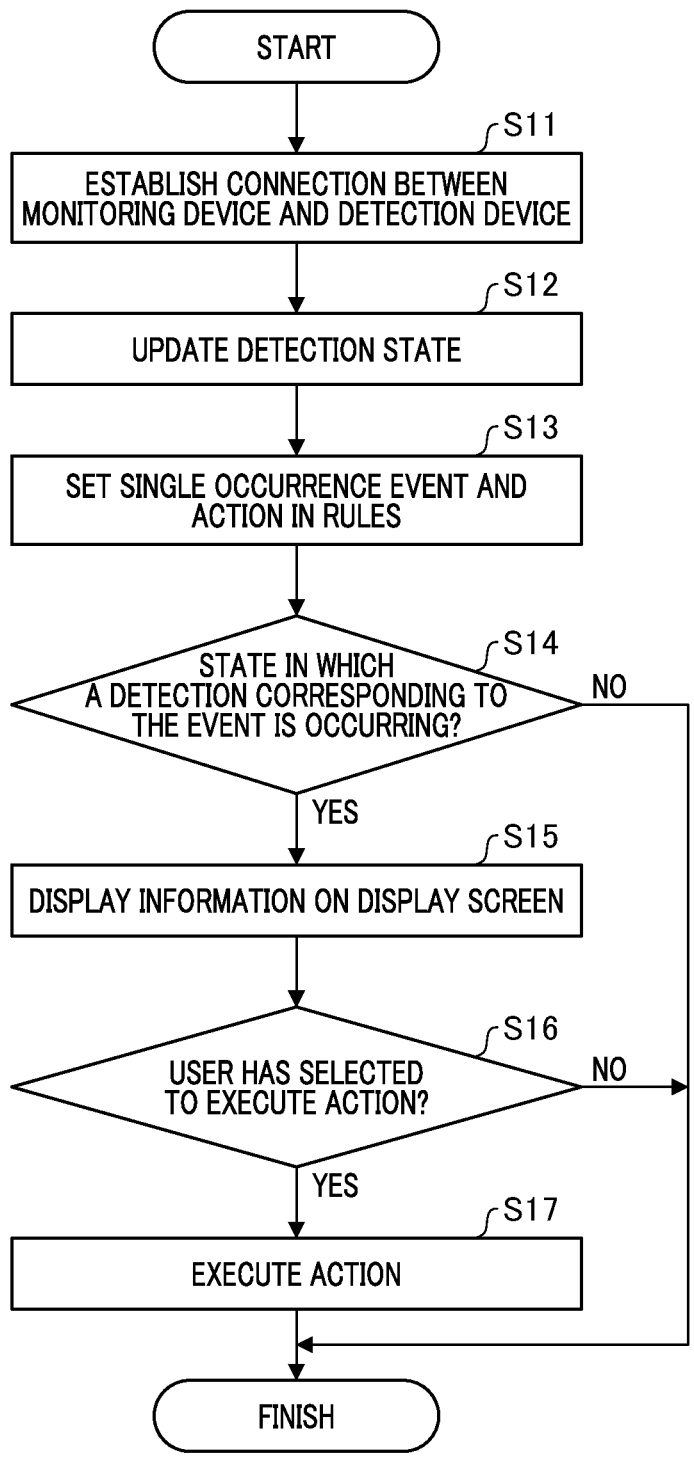
FIG. 7 is a flowchart showing processing of the monitoring device 1 according to the first embodiment.

FIG. 7 is a flow chart showing the processing for the monitoring device 1 according to the first embodiment. In the flow chart in FIG. 7, when a single occurrence event and the rule for the action are set or changed in the monitoring device 1 as in FIG. 5, processing is performed to execute a notification with the information that a detection corresponding to the event has already occurred in the detection device 3, and prompting the execution of the action. Note that the flowchart in FIG. 7 is realized by the control unit 11 of the monitoring device 1 executing a computer program that has been stored on a storage unit 12.

In step S11, processing for registering the detection device 3 to the network 5 and establishing a connection with the monitoring device 1 is executed by the control unit 11. That is, the control unit 11 sends and receives commands between itself and the detection unit 3 via the communication unit 15 for exchanging each type of information that is necessary for registering the detection device 3 as a device on the network 5.

Each type of information that is necessary includes the basic information for controlling the detection device 3 such as information for usable commands in relation to the detection device 3, information for coding the communication path, settings information for the operating times for the detection unit 3, node numbers, product identification numbers, and the like.

The control unit 11 stores the information that was acquired during step S11 in the storage unit 12, and the registration of the detection device 3 is thereby completed. Below, the explanation will be continued with "2" as the node number for the detection device 3. Note that, for example, the detection device 3 replies to the monitoring device 1 with the occurrence state for event detection using commands such as Notification Report or the like by receiving commands such as Notification Get, or the like.

When doing so, processing for confirming the state of the detection before the connection was established, and storing this information in the storage unit 12 may also be added to the monitoring device 1, as is shown in step S22 of FIG. 10, which will be described below.

In step S12, in the period between establishing the connection in step S11 and setting or changing rules in step S13, the control unit 11 of the monitoring device 1 stores and updates the states of detection for the detection device 3 corresponding to each event in the storage unit 12.

Specifically, if a notification command corresponding to a single occurrence event is received from the detection device 3 via the communication unit 15, the control unit 11 stores information in the storage unit 12 to the effect that a detection corresponding to this event has already occurred. That is, in the case in which a notification command is received from an external device, and in which it has been stored in the storage unit 12 that the detection information has not been detected, the detection information is updated to detection completed.

For example, it is assumed that the monitoring device 1 receives a Notification Report command corresponding to an illegal operation (movement) event as is shown in FIG. 3, from the detection unit 3. Note that it is assumed that from among the fields showing notification contents, the Notification Type is home security, and the Notification Event/State is tampering, product moved.

In accordance with this, the monitoring device 1 stores, in the storage unit 12, that the detection corresponding to this event has occurred along with reception time for the command. Note that like stateful events, although the detection states are also stored and updated in the same manner, an explanation of the processing therefor will be given in step 23 of FIG. 10 in the second embodiment.

In step S13, the control unit 11 receives rule settings that have been selected by the user via the display screen 21, shown in FIG. 5, from the client device 2, and stores these rule settings in the storage unit 12. In the example that is displayed on the display screen 21 in FIG. 5, when a notification is received from the node 2 that an illegal operation (movement) has occurred as the event, the contents of the rule setting #1 for starting image recording are saved as the action.

The control unit 11 thereby controls the execution of the indicated action in the case in which an event has occurred based on the rule settings that have been stored in the storage unit 12. In this context, step S13 functions as a rule control step (a rule control unit) that executes a pre-determined action according to a detection of pre-determined information.

In step S14, the control unit 11 determines whether or not the notification corresponding to the event that was set in step S13 is in a state in which it has already occurred. Specifically, the control unit 11 references information relating to the detection state that has been stored in the storage unit 12, and determines if the event that was set as a rule is in an already detected state.

In this context, step S14 functions as a determination step (a determining unit) that determines whether or not pre-determined information has been detected based on detection information as to whether or not an external device has already detected the pre-determined information.

For example, in the case that the contents displayed on the display screen 21 have been set, if information to the effect that the detection for an illegal operation (movement) has already occurred has been stored, it is determined that a detection has occurred, and if this information has not been stored, it is determined that a detection has not occurred. In the case in which it has been determined that a detection has occurred, the processing transitions to step S15, and if it has not, the processing for the flowchart in FIG. 7 is completed.

In step S15, the control unit 11 sends a command to the client device 2 to put out a display on the display unit for information showing that a detection corresponding to an event that was set in the rules has occurred, and to prompt if the action should be executed immediately. That is, information such as a display that queries whether or not to execute the action is transmitted to the display control device.

Specifically, the control unit 11 acquires actions that have been linked to detection times and events by referencing the storage unit 12, and puts out a command to the client device 2 via the communication unit 15 so as to execute display control such as that in FIG. 6.

Step S15 functions as a communication control step (a communication control unit) that transmits information to the display control unit so as to display a message that detection has occurred in the case in which it has been determined by the determination unit that pre-determined information has already been detected when setting or changing a rule.

In step S16, the control unit 11 determines whether or not the execution of the action that was prompted in step S15 has been selected. Specifically, the control unit 11 acquires information as to whether or not the execution of the action was selected from the client device 2 via the communication unit 15 and makes a determination.

In the case in which the button 223 of the FIG. 6 has been pressed, information to the effect that the execution of the action has been selected in the client device 2 is transmitted, and in the case in which the button 224 has been pressed, information to the effect that the execution of the action has not been selected is transmitted, or nothing is transmitted. In the case in which the execution of the action has been selected, the processing transitions to step S17, and if this is not the case, the processing of the flow chart in FIG. 7 is completed.

In step S17, the control unit 11 controls the execution of the action that has been set in the rules. For example, in the example of the display screen 21, start image recording has been selected as the action, and therefore, the control unit 11 starts the storage of video image data that has been captured by the image capturing unit 13 and compressed by the compressing and encoding unit 14 to serve as image recording data to the storage unit 12 or the storage unit of an external storage device that is not illustrated.

As has been explained above, according to the first embodiment, the monitoring device 1 stores information as to whether or not detections corresponding to each event have already occurred in the storage unit 12 accompanying the establishment of the connection with the detection unit 3.

In addition, this information is confirmed when rules are set, and in the case in which it has been determined that a detection has already occurred for a single occurrence event that has been set in the rules, a display such as that in FIG. 6 is displayed on the display screen of the client device 2, in which information to the effect that a detection has occurred is shown, and the execution of the action is prompted.

Therefore, even if a single occurrence event that was set in the rules has already been detected, errors such as an action not being executed, or the like, which is not the intension of the user, can be avoided.

Second Embodiment

The case in which a single occurrence event is set as the event in the rule settings has been explained in the first embodiment. However, in the second embodiment, the case in which a stateful event that holds a plurality of states is set as the event in the rule settings will be explained. Note that the configuration of the monitoring system according to the present embodiment is the same as that of the first embodiment.

FIG. 8 is a diagram showing an example of a table for a stateful event according to the second embodiment. Examples of events that can be used in the rule settings are shown in the first item, information as to whether the event is a stateful event or a single occurrence event is shown in the second item, and examples of events that are made pairs for creating a state in the case in which the event is a stateful event are shown in the third item.

As is shown in FIG. 8, the illegal operation (movement) event that is set in the rules in the first embodiment is a single occurrence event, and therefore the value for the second item is NO. In addition, it is understood that a moving body detection event is a stateful event, and the event that is made its pair for generating the state is a moving body not detected event.

That is, the "ON (Active)" state when a moving body detection occurs serves as the state for the moving body detection event, and it can be seen that when a moving body not detected event is occurring, this becomes the "OFF (inactive)" state. As another example, it is understood that a door opening event is a stateful event, and the event that is made its pair is a door closing event.

Note that the events that are disclosed in the table that is shown in FIG. 8 are one example of events, and in actuality, information regarding a larger number of events may also be disclosed therein. In addition, there may be two or more events that become pairs for an event, and in this case, a plurality of states may also be generated. In addition, it is assumed that a table such as that in FIG. 8 has been stored in the storage unit 12 in advance.

Next, FIG. 9 will be used to explain examples of the rule settings in the monitoring device 1, and the timings at which notification commands are transmitted due to the occurrence of detections corresponding to events in the detection device 3.

Figure 9A:
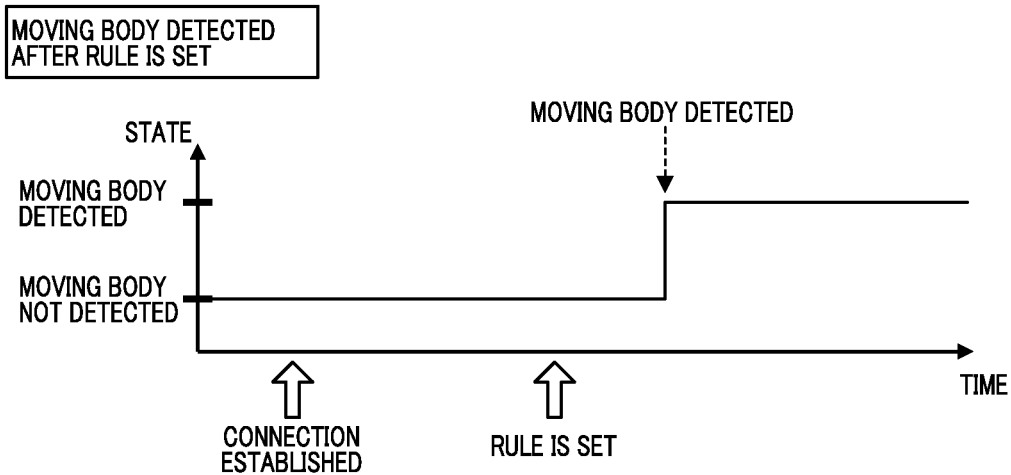
FIGS. 9A to 9C are diagrams for explaining examples of timings for the occurrence of detections corresponding to stateful events, and for rule setting.
Figure 9B:
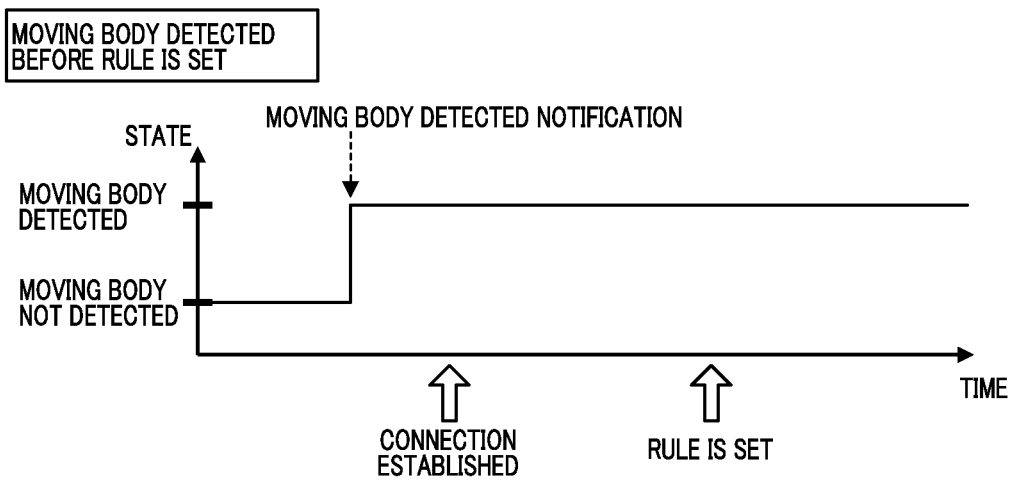
Figure 9C:
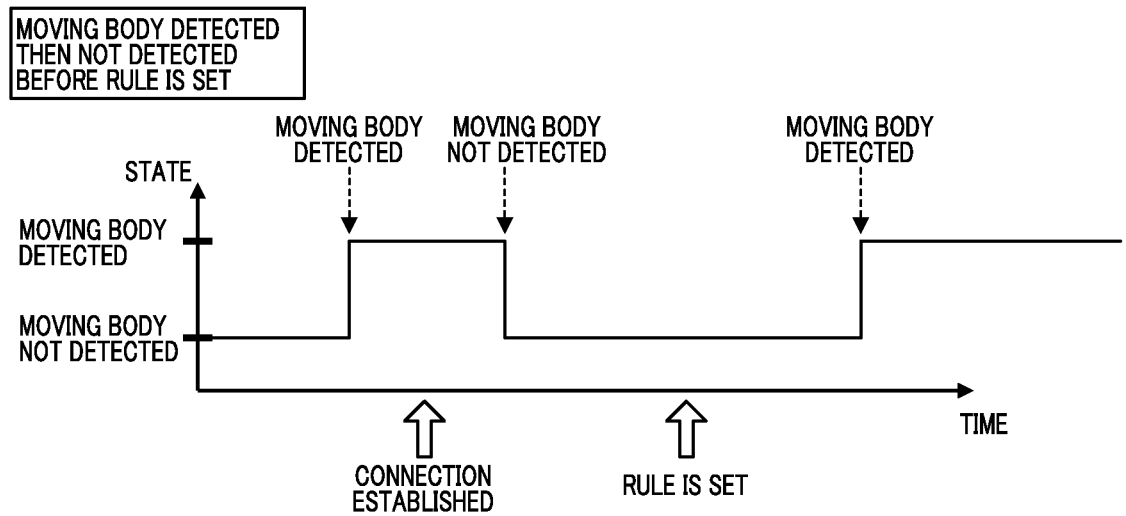

FIGS. 9A to 9C are diagrams for explaining examples of timings for the occurrence of detections and rule settings corresponding to stateful events. In the rule settings in FIGS. 9A to 9C, it is assumed that a stateful has been set.

In FIGS. 9A to 9C, the monitoring device 1 receives a control command related to rule settings from the client device 2 after a connection has been established to make mutual communication with the detection device 3 possible. A rule that is configured by notification commands received from the detection unit 3, events related thereto, and predetermined actions is thereby set.

Note that in FIG. 9, as an example, a moving body detection event is set as the event in the rule settings. Note that FIG. 9A is a diagram showing an example in which a moving body is detected after the rule is set, FIG. 9B is a diagram showing an example in which a moving body has been detected before the rule is set, and FIG. 9C is a diagram showing an example in which the two detections of a moving body detected and a moving body not detected have been made before the rule was set.

In each of the graphs in FIGS. 9A to 9C, the two states of a moving body detected state and a moving body not detected state exist in the detection device 3 to serve as the moving body detection states. Upon a moving body detection occurring in the detection device 3 at the time of the no moving body detected state, the state transitions to the moving body detected state, and a notification command for a moving body detection is transmitted by the detection device 3 (however, if this is before a connection has been established with the monitoring device 1, this is not transmitted to the monitoring device 1).

In addition, upon a moving body not detected state occurring in the detection device 3 at the time of a moving body detected state, the state transitions to a moving body not detected state, and a communication command for a moving body not detected state is transmitted by the detection device 3 (however, if this is before a connection has been established with the monitoring device 1, this is not transmitted to the monitoring device 1).

In the example in FIG. 9A, during the period between the connection being established with the detection device 3 and the rule being set, a moving body detection does not occur, and a moving body detection occurs after the rule is set, and a notification command for a moving body detection is transmitted. That is, the notification command for the moving body detection is transmitted from the detection device 3 to the monitoring device 1 at the timing during which a moving body detection occurs after the rule is set, and the action that has been set in the rules is executed.

In contrast, in the example in FIG. 9B, a moving body detection has occurred before the connection with the detection device 3 is established, and the moving body detection state continues after the rule is set. Thus, the notification command for the moving body detection is not transmitted to the monitoring device 1 after the rule is set, and the action that has been set in the rules is not triggered.

Therefore, even though a moving body detection is already occurring, the action that has been set in the rules will not be executed until the state transitions to a moving body detection state again after having returned to a moving body not detected state, and the moving body detection notification command is transmitted.

In addition, in the example in FIG. 9C, although a moving body detection has occurred before the connection with the detection device 3, and the state has transitioned to the moving body detection state, after this, a moving body not detected detection occurs, the state once again becomes a moving body not detected state, and the rules are set after this.

Thus, in this case, the notification command for the moving body detection is transmitted from the detection device 3 to the monitoring device 1, and the action that has been set in the rules is executed at the timing for when the moving body detection has occurred after the rule is set, in the same manner as the example in FIG. 9A.

Next, the flow of the second embodiment will be explained in reference to FIG. 10. FIG. 10 is a flowchart showing the processing for the monitoring device 1 according to the second embodiment. Note that the flowchart in FIG. 10 is realized by the control unit 11 of the monitoring device 1 executing a program that has been stored on the storage unit 12.

Figure 10:
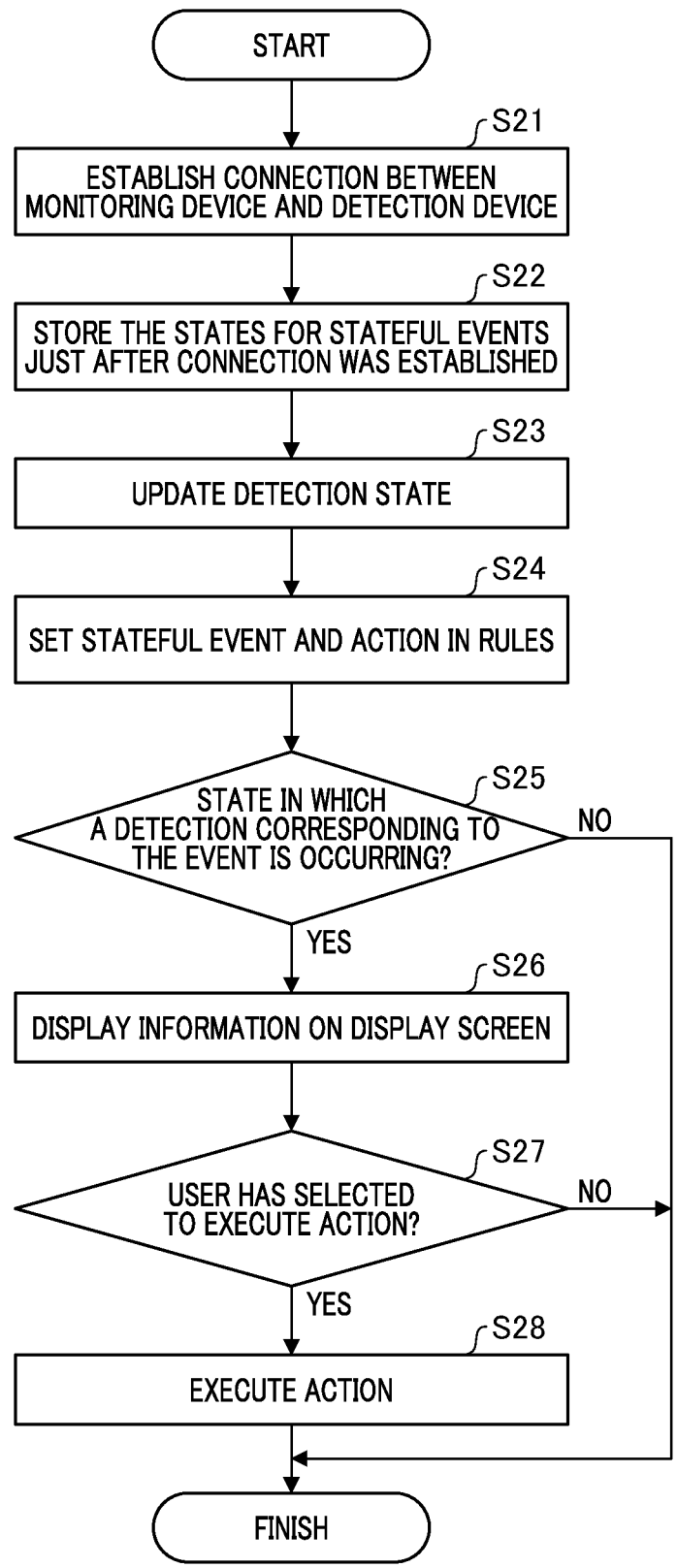
FIG. 10 is a flowchart showing processing for the monitoring device 1 according to a second embodiment.

In the flow for the monitoring device 1 according to the second embodiment that is shown in FIG. 10, when the rule for a stateful event or an action is set or changed, it is determined if there is information about a detection corresponding to this event having already occurred in the detection device 3. In addition, in the case in which it has already occurred, the user is notified of this, and is queried or prompted to execute this action.

The processing for step S21 is the same as that for step S11 in FIG. 7. In step S22, the control unit 11 acquires the occurrence state in the detection device 3 for a detection corresponding to a stateful event immediately after the connection is established, and stores (saves) this. That is, it confirms that a detection has not already occurred before the connection was established.

In this context, with regards to which notification command and field thereof the detection device 3 corresponds to, when the connection is established, the control unit 11 acquires these via the communication unit 15, and stores these in the storage unit 12. Therefore, the control unit 11 refers to the tables from FIG. 3, and FIG. 8 that are stored in the storage unit 12, and the information for the notification commands corresponding to the detection device 3 and the fields therefor.

In addition, the control unit 11 acquires the states of the detections corresponding to each stateful event from the detection unit 3 via the communication unit 15, and stores this in the storage unit 12.

For example, if it is assumed that the events corresponding to the detections of the detection unit 3 are an illegal operation (movement), moving body detected, and moving body not detected, it is understood from FIG. 8 that the stateful event is the moving body detected detection (and the moving body not detected detection).

The control unit 11 transmits a command to the detection device 3 that confirms the detection state for the moving body detection, and receives a notification command. That is, in the present embodiment, a command for confirming whether or not pre-determined information has been detected by an external device is transmitted to the external device, and detection information to the effect that the detection has occurred is acquired.

The confirming command is specifically a Notification Get command, and home security is indicated in the Notification Type for the command field.

In addition, in the Notification Event/State, motion detection is indicated. Alternatively, the Notification Type may also be made 0xFF, and the Notification Event/State may also be made 0x00.

The notification command for the moving body detection is the same as that which has been explained in FIG. 3 in the first embodiment. In addition, if the notification command showing the notification contents for the moving body detection is returned, the moving body detection is in the already occurred state, and if the notification command shows the notification contents for moving body not detected, it is understood that the moving body detection is not in an already occurred state. The state of the moving body detection acquired in this manner is stored in the storage unit 12.

If the detection device 3 also responds with the detection occurrence state for before the connection was established in relation to a detection corresponding to a single occurrence event, the same processing may also be executed. In addition, in the case in which the detection device 3 does not respond to a command confirming the detection step, the processing for the present step may be omitted.

In step S23, between the period during which the connection is established in step S11 and the rules are set in step S13, the state for each detection of the detection device 3 is for example, successively stored and updated at a pre-determined cycle.

Specifically, if a notification command corresponding to an event has been received from the detection device 3 via the communication unit 15, the control unit 11 stores the information that the detection corresponding to this event has already occurred in the storage unit 12. However, in the case of a stateful event, in the case in which a notification command corresponding to the event that this event's pair has been received, the state returns to a state in which this detection has not already occurred.

That is, notification commands relating to other information that makes a plurality of states are received together with pre-determined information, and in the case in which the detection information relating to the pre-determined information has been stored in the storage unit as already detected, the detection information is updated to not already detected.

For example, even in a moving body detection state as shown in FIG. 9C, if a moving body not detected notification command is received thereafter, the moving body detection returns to the detection has not occurred state. Note that although the storage of the detection states is also updated in the same manner as a singular event, this processing is the same as that for the step S12 in FIG. 7 that was explained in the first embodiment.

The processing for steps S24 to S28 is the same as the processing for each of steps S13 to S17 in FIG. 7. However, in FIG. 10, it is assumed that a stateful event has been set in step S24, and for example, it is assumed that receiving a notification in the case in which a moving body detection from the node number 2 has occurred as the event has been set as the event.

As has been described above, according to the second embodiment, the monitoring device 1 stores information as to whether or not detections corresponding to each event have already occurred in the storage unit 12 from after the establishment of the connection with the detection device 3. However, in the case in which the detection corresponds to a stateful event, the state is maintained, and if a detection for the event that is the pair for this event occurs, the state transitions to the state in which a detection has not already occurred.

Specifically, when the rule is set, the information that has been stored in the storage unit 12 is confirmed. In addition, it the case in which it has been determined that the detection of a stateful event that has been set in the rules has occurred, information showing that the detection has occurred, and a display prompting the execution of the action are displayed on the display screen of the client device 2. Therefore, it is possible to avoid errors such as actions not being executed, which is not the user's intension, even if an event that has been set in the rules has already occurred.

OTHER EMBODIMENTS

Although favorable embodiments of the present invention have been described above, the present invention is not limited to these specific embodiments, and changes and the like within the scope of the present invention are possible, and the first embodiment and the second embodiment that have been described above may also be appropriately combined.

For example, the control unit 11 may also transmit a Z-Wave Plus Info Get command via the communication unit 15 when the connection with the detection device 3 is established, and as a response may also receive a Z-Wave Plus Info Report command.

In addition, information as to whether or not the response command is always transmitted immediately without the detection device 3 entering a sleep mode may also be acquired from the value of the Role Type field that is included in the Z-Wave Plus Info Report Command.

When doing so, upon receiving commands such as Notification Get and the like, the detection device 3 may also always immediately respond with the occurrence state of past detections using a command of a Notification Report or the like.

In such a case, the control unit 11 may also communicate with the detection unit 3 and confirm the occurrence state of detections corresponding to events using a command such as Notification Get or the like when setting rules, without performing the processing for step S12 and step S22, or step S23.

In addition, the processing may also be made such that the events that have been set in the rules are also generated by the values for additional conditions that have been set in the events being satisfied in addition to the reception of a notification command. In this case, it is sufficient if all of the reception information for the notification command and the information for the values relating to the detections included in the notification command are stored in the storage unit 12, and it is determined if a detection corresponding to the event that has been set has occurred.

For example, assume that the event that has been set in the rules is a temperature change event, and that the value for the additional conditions is a change of 10° C. or greater. In this case, when the rules are set, the control unit 11 confirms the information that has been stored in the storage unit 12. In addition, if a temperature change has occurred by the time that the rule is set (a notification command corresponding to a temperature change has been received), and the value for the temperature that is included in this notification command has changed by 10° C. or greater, it is assumed that a detection for a temperature change of 10° C. or greater has occurred.

In addition, the processing for the step S23 in the second embodiment may also be made such that even in the case of a stateful event, if a detection occurred state has occurred once, even if a notification command corresponding to the event that is this event's pair is received, the state does not return to the detection has not occurred state.

In addition, the events that are the targets of the processing in the flowchart in FIG. 7, and FIG. 10 may also be events that indicate abnormalities in the detection device 3 itself. For example, the possibility that detections for events such as an illegal operation (movement), an illegal operation (cover removed), reductions in the battery charge amount, or the like, will occur again is low unless the user notices the abnormality and does not normalize the state of the detection device 3 itself again.

Therefore, in the case in which a detection occurs before the rules are set, there is a high possibility that the situation in which the user does not notice these abnormalities will continue, and therefore, it is sufficient if the processing is made such that events that show abnormalities in detection unit 3 itself are detected before the rules are set.

In addition, all or a portion of the functional components of the above-described monitoring system may also be built into the monitoring device 1, the client device 2, or the detection device 3 as hardware.

In addition, the monitoring device 1 may also realize at least a portion of its configuration using hardware. In the case in which this is realized by hardware, it is sufficient if, for example, dedicated circuits are automatically generated on an FPGA (Filed Programmable Gate Array) from the program for executing each step by using a pre-determined compiler.

In addition, it may also be made such that gate array circuits are formed in the same manner as the FPGA, and are realized as hardware. In addition, it may also be made such that these are realized by an ASIC (Application Specific Integrate Circuit).

In addition, the configurations, processing, and the like for each of the above-described embodiments may also be applied to computers or each type of device other than the monitoring device 1, the client device 2, and the detection device 3.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the monitoring apparatus through a network or various storage media. Then, a computer (or a CPU, an MPU, or the like) of the monitoring apparatus may be configured to read and execute the program. In such a case, the program and the storage medium storing the program configure the present invention.

This application claims the benefit of Japanese Patent Application No. 2022-069967, filed on Apr. 21, 2022, which is hereby incorporated by reference herein in its entirety.

What is claimed is:

1. A monitoring device comprising at least one processor or circuit configured to function as:
   a rule control unit configured to execute a pre-determined action according to a detection of pre-determined information for which a notification command is received from an external device;
   a determination unit configured to determine whether or not the detection of the pre-determined information has already occurred based on detection information;
   a communication unit configured to receive the notification command from an external device to detect the pre-determined information; and
   a notification control unit configured to, when rules in the rule control unit are set or changed, in the case in which it has been determined by the determination unit that the pre-determined information has already been detected, transmit information to a display control device so as to display a message to notify that the detection has already occurred.

2. The monitoring device according to claim 1, wherein when communication is established with the external device, the communication unit acquires detection information as to whether or not the external device has already detected the pre-determined information, and the detection information is stored in a storage unit.

3. The monitoring device according to claim 2, wherein the communication unit receives a notification command from the external device, and in the case in which it has been stored in the storage unit that the detection information has not already been detected, updates the detection information to already detected.

4. The monitoring device according to claim 2, wherein the communication unit receives a notification command related to the pre-determined information and other information for making a plurality of states, and in the case in which it has been stored in the storage unit that the detection information related to the pre-determined information has already been detected, updates the detection information to not already detected.

5. The monitoring device according to claim 2, wherein the notification control unit acquires the detection information by transmitting a command to the external device that confirms information as to whether or not the external device has already detected the pre-determined information.

6. The monitoring device according to claim 2, wherein the notification control unit transmits information to a display control device so as to display a detection occurrence time included in the notification command or a notification command reception time.

7. The monitoring device according to claim 6, wherein the notification control unit transmits information to a display control device so as to display a plurality of detection occurrence times that have occurred in the past or the reception time for the notification command.

8. The monitoring device according to claim 1, wherein the notification control unit transmits information to a display control device such that a query asking whether to execute the action is displayed.

9. The monitoring device according to claim 1, wherein the pre-determined information includes information that shows a state of the external device itself.

10. A monitoring method comprising:
    a rule control step for executing a pre-determined action in response to detection of pre-determined information for which a notification command is received from an external device;
    a determining step for determining whether or not the detection of the pre-determined information has already been occurred based on the detection information;
    a communication step for receiving the notification command from the external device to detect the pre-determined information; and
    a notification control step, when rules in the rule control step are set or changed, in the case in which it has been determined by the determination step that the pre-determined information has already been detected, for transmitting information to a display control device so as to display a message to notify that detection has already occurred.

11. A non-transitory computer-readable storage medium configured to store a computer program comprising instructions for executing following processes:
    a rule control step for executing a pre-determined action in response to detection of pre-determined information for which a notification command is received from an external device;
    a determining step for determining whether or not the detection of the pre-determined information has already been occurred based on the detection information;
    a communication step for receiving the notification command from the external device to detect the pre-determined information; and
    a notification control step, when rules in the rule control step are set or changed, in the case in which it has been determined by the determination step that the pre-determined information has already been detected, for transmitting information to a display control device so as to display a message to notify that detection has already occurred.

* * * * *